United States Patent
Walker et al.

(10) Patent No.: US 11,113,708 B1
(45) Date of Patent: Sep. 7, 2021

(54) SYSTEM FOR GENERATING A DIGITAL COUPON BASED UPON COLLECTED USER CARD EXCHANGE INFORMATION AND RELATED METHODS

(71) Applicant: INMAR CLEARING, INC., Winston-Salem, NC (US)

(72) Inventors: Jess D. Walker, Georgetown, TX (US); David E. Johnson, Cedar Park, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 136 days.

(21) Appl. No.: 16/011,921

(22) Filed: Jun. 19, 2018

Related U.S. Application Data

(60) Provisional application No. 62/526,040, filed on Jun. 28, 2017.

(51) Int. Cl.
*G06Q 30/02* (2012.01)
*G06Q 30/06* (2012.01)

(52) U.S. Cl.
CPC ..... *G06Q 30/0207* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,783,532 B2 | 8/2010 | Hsu et al. | |
| 2001/0014870 A1* | 8/2001 | Saito | G06Q 20/204 705/14.26 |
| 2003/0074259 A1* | 4/2003 | Slyman, Jr. | G06Q 30/0221 705/14.22 |
| 2005/0012723 A1* | 1/2005 | Pallakoff | G06F 1/1618 345/173 |
| 2006/0053060 A1 | 3/2006 | Wyker et al. | |
| 2007/0156513 A1 | 7/2007 | Mastrianni et al. | |
| 2008/0154714 A1* | 6/2008 | Liu | G06Q 30/02 705/14.25 |
| 2009/0182663 A1* | 7/2009 | Hurst | G06Q 20/105 705/41 |
| 2009/0327129 A1* | 12/2009 | Collas | G06Q 20/102 705/41 |
| 2011/0295705 A1* | 12/2011 | Kasmei | G06Q 20/20 705/16 |
| 2012/0136706 A1* | 5/2012 | Chang | G06Q 30/0219 705/14.21 |
| 2013/0006742 A1 | 1/2013 | Richard | |
| 2013/0030901 A1* | 1/2013 | Eichstaedt | G06Q 30/0207 705/14.26 |
| 2013/0073369 A1 | 3/2013 | Begum | |

(Continued)

*Primary Examiner* — Bion A Shelden
(74) *Attorney, Agent, or Firm* — Allen, Dyer, Doppelt + Gilchrist, P.A.

(57) ABSTRACT

A system may include a gift card generation server configured to generate electronic gift cards. The system may also include a gift card exchange server cooperating with the gift card generation server and configured to provide a user exchange marketplace for the electronic gift cards and collect user card exchange information based thereon. The gift card exchange server may also be configured to generate at least one digital coupon based upon the user card exchange information.

28 Claims, 3 Drawing Sheets

(56) References Cited

U.S. PATENT DOCUMENTS

| | | | |
|---|---|---|---|
| 2013/0073459 A1* | 3/2013 | Zacarias | G06Q 20/36 |
| | | | 705/41 |
| 2013/0159086 A1* | 6/2013 | Richard | G06Q 30/0233 |
| | | | 705/14.33 |
| 2013/0191280 A1* | 7/2013 | Simonian | G06Q 20/354 |
| | | | 705/41 |
| 2014/0032283 A1* | 1/2014 | Bradford | G06Q 20/387 |
| | | | 705/14.1 |
| 2014/0129305 A1 | 5/2014 | Frame | |
| 2014/0249904 A1* | 9/2014 | Nelsen | G06Q 20/351 |
| | | | 705/14.23 |
| 2014/0249986 A1* | 9/2014 | Wolfe | G06Q 40/04 |
| | | | 705/37 |
| 2015/0046240 A1 | 2/2015 | Moreton | |
| 2015/0227956 A1 | 8/2015 | McCowin | |
| 2015/0269602 A1 | 9/2015 | Novick et al. | |
| 2015/0332250 A1* | 11/2015 | Culwell | G06Q 20/354 |
| | | | 705/39 |
| 2015/0356591 A1* | 12/2015 | Fano | G06Q 30/0224 |
| | | | 705/14.27 |
| 2017/0083959 A1* | 3/2017 | Bousis | G06Q 30/0609 |
| 2017/0193503 A1* | 7/2017 | Oppenheim | G06Q 20/401 |

\* cited by examiner

SYSTEM FOR GENERATING A DIGITAL COUPON BASED UPON COLLECTED USER CARD EXCHANGE INFORMATION AND RELATED METHODS

RELATED APPLICATIONS

The present application claims the priority benefit of provisional application Ser. No. 62/526,040 filed on Jun. 28, 2017, the entire contents of which are herein incorporated in its entirety by reference.

TECHNICAL FIELD

The present invention relates to the field of electronics, and more particularly, to the processing of digital promotions and related methods.

BACKGROUND

A gift card is a prepaid stored-value money card that may be issued by a retailer or bank, for example, to be used as an alternative to cash for purchases within a particular store, for a particular product, or a particular brand. A gift card may also be used as a promotional item, for example, given away by a retailer to entice the recipient to make a purchase at the retailer. The use of gift cards is relatively high, for example, because of its ease of acquisition and ease and versatility of use.

Many gift cards are not redeemed. For example, a given user that has received a gift card may not be interested in the retailer or store, the particular product, and/or the particular brand corresponding to the gift card. In an attempt to capitalize on those disinterested in gift cards or a particular gift card, a marketplace for gift cards has emerged that permits users to sell their unused gift cards or buy discounted gift cards to desired retailers, brands, or items. One such company is Raise. Raise is an online gift card marketplace where a user can sell gift cards for cash or buy discount gift cards to desired brands.

Similar to some uses of a gift card, another form of marketing is a coupon, typically in paper form, and provides a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A typical coupon is applicable to a given product and has a redeemable value that may vary based upon the quantity of a given item, size of the product in terms of packaging, and/or the price point of the given item, for example. Coupons may also be exchanged. For example, U.S. Patent Application Publication No. 2007/0156513 to Mastrianni discloses a coupon exchange network. U.S. Patent Application Publication No. 2013/0073369 to Begum discloses products of a particular brand using a redemption bank, which can be used by the consumer as a credit toward the purchase of one or more products of the particular brand.

SUMMARY

A system may include a gift card generation server configured to generate a plurality of electronic gift cards. The system may also include a gift card exchange server cooperating with the gift card generation server and configured to provide a user exchange marketplace for the plurality of electronic gift cards and collect user card exchange information based thereon. The gift card exchange server may also be configured to generate at least one digital coupon based upon the user card exchange information.

The user card exchange information may include at least one of a brand, item for purchase, and retailer associated therewith. The gift card exchange server may be configured to generate the at least one digital coupon for one of a different brand, different item for purchase, and different retailer, for example. The gift card exchange server may be configured to generate the at least one digital coupon for one of a same brand, same item for purchase, and same retailer, for example.

The user card exchange information may include at least one of an initial value, a current value, and desired sale value associated with a given one of the plurality of electronic gift cards. The user card exchange information may include at least one of a current value and an acquisition value of a given one of the plurality of electronic gifts cards, for example.

The gift card exchange server may include a processor and a memory coupled thereto for storing the user card exchange information. The user card exchange information may include historical electronic gift card exchange information, for example.

The gift card exchange server may be configured to communicate the collected user card exchange information to the gift card generation server, for example. The user card exchange information may include user card exchange information for a plurality of users for a given one of the plurality of electronic gift cards.

A method aspect is directed to a method for generating at least one digital coupon in a system that includes a gift card generation server configured to generate a plurality of electronic gift cards. The method may include using a gift card exchange server cooperating with the gift card generation server to provide a user exchange marketplace for the plurality of electronic gift cards and collect user card exchange information based thereon to generate at least one digital coupon based upon the user card exchange information.

A computer readable medium aspect is directed to a non-transitory computer readable medium for a system that includes a gift card generation server configured to generate a plurality of electronic gift cards and a gift card exchange server cooperating with the gift card generation server. The non-transitory computer readable medium includes computer executable instructions that when executed by a processor of the gift card exchange server cause the processor to perform operations that may include providing a user exchange marketplace for the plurality of electronic gift cards and collect user card exchange information based thereon. The operations may also include generating at least one digital coupon based upon the user card exchange information.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
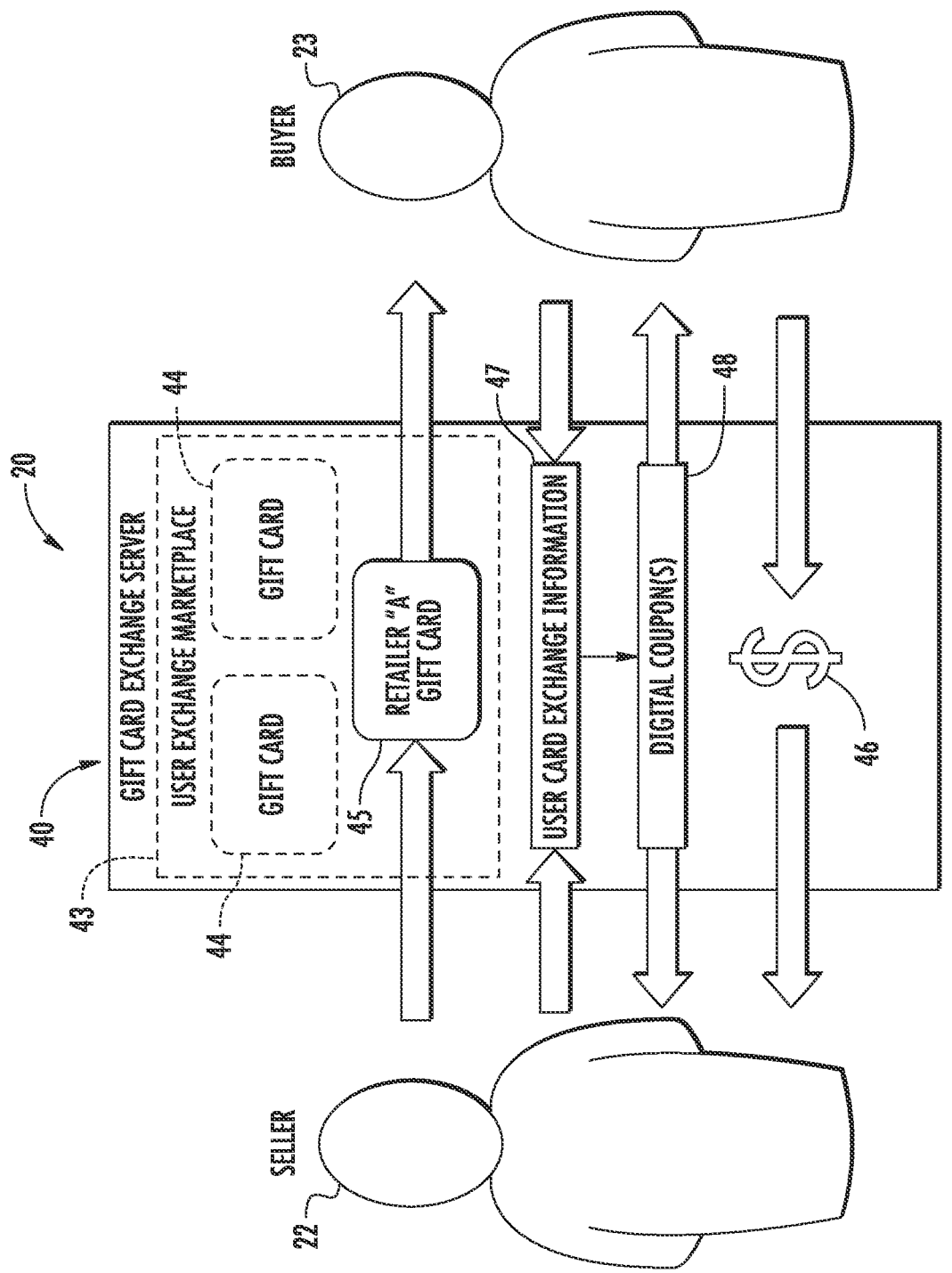
FIG. 1 is an operational schematic diagram of a portion of a system in accordance with an embodiment.
Figure 2:
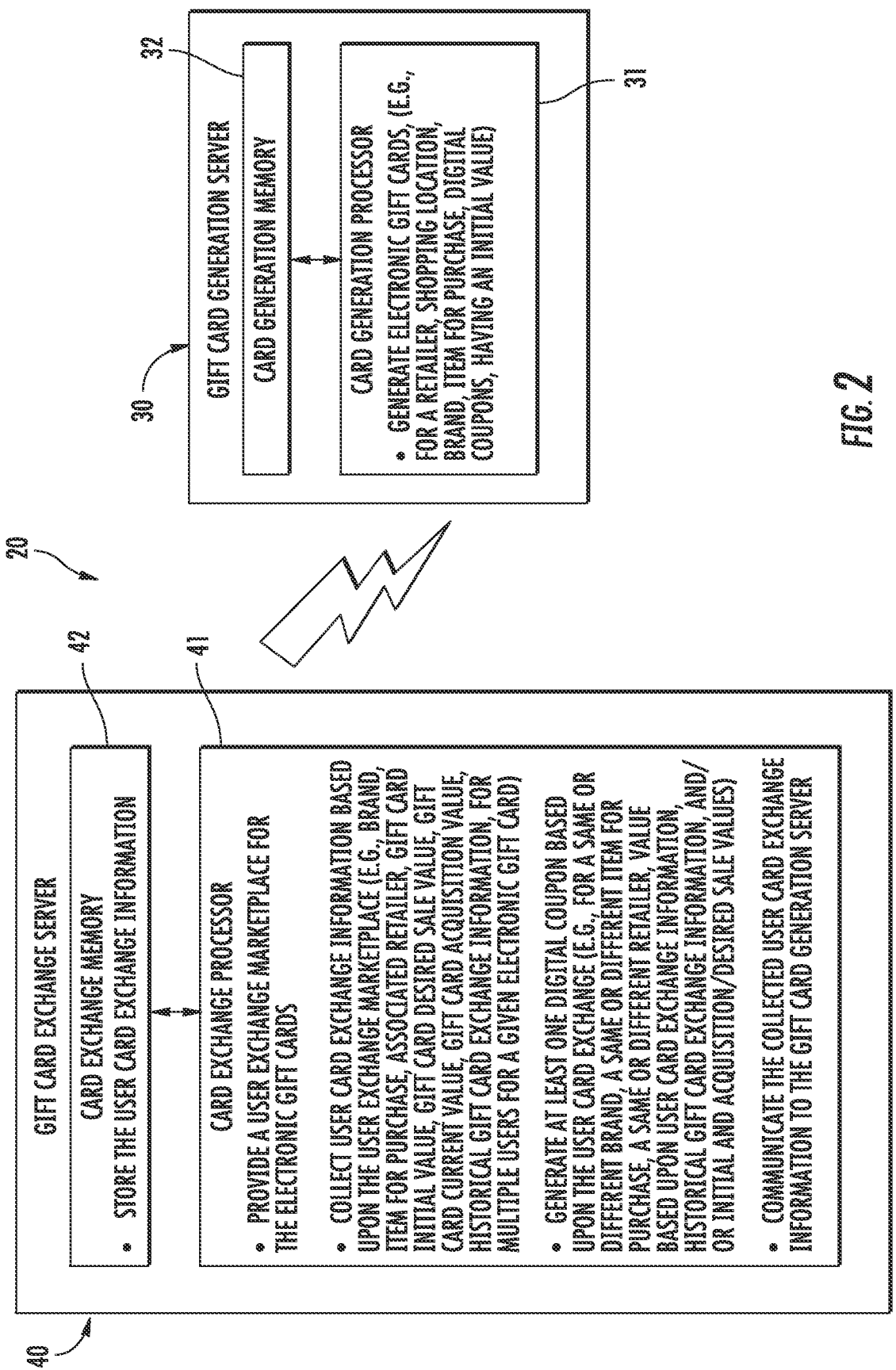
FIG. 2 is a schematic block diagram of a system in accordance with an embodiment.

Referring to FIGS. 1 and 2, a system 20 includes a gift card generation server 30. The gift card generation server 30 includes a card generation processor 31 and card generation memory 32 coupled thereto. The gift card generation server 30, by way of cooperation between the card generation processor 31 and the card generation memory 32, generates electronic gift cards 44. User card exchange information 47 may be associated with the electronic gift card 44. In particular, the electronic gifts cards 44 may be for any of a particular retailer, brand, shopping location (e.g., shopping mall, online, and/or brick and mortar), and/or a particular item or items for purchase. In some embodiments, the electronic gift cards 44 may be in the form of digital coupons. Each of the electronic gift cards 44 may not be the same type, for example, some may be for a given retailer, while others are for a particular item, etc.

Each of the electronic gift cards 44 also has an initial value associated therewith and current value associated therewith. For example, a given electronic gift card 45 may be for retailer "A" and had an initial value of $100. A given user may have used some of the electronic gift card so that the current value of the given electronic gift card is, for example, $75.

The system 20 also includes a gift card exchange server 40 cooperating with the gift card generation server 30. The gift card exchange server 40 includes a card exchange processor 41 and a card exchange memory 42 coupled to the card exchange processor.

Figure 3:
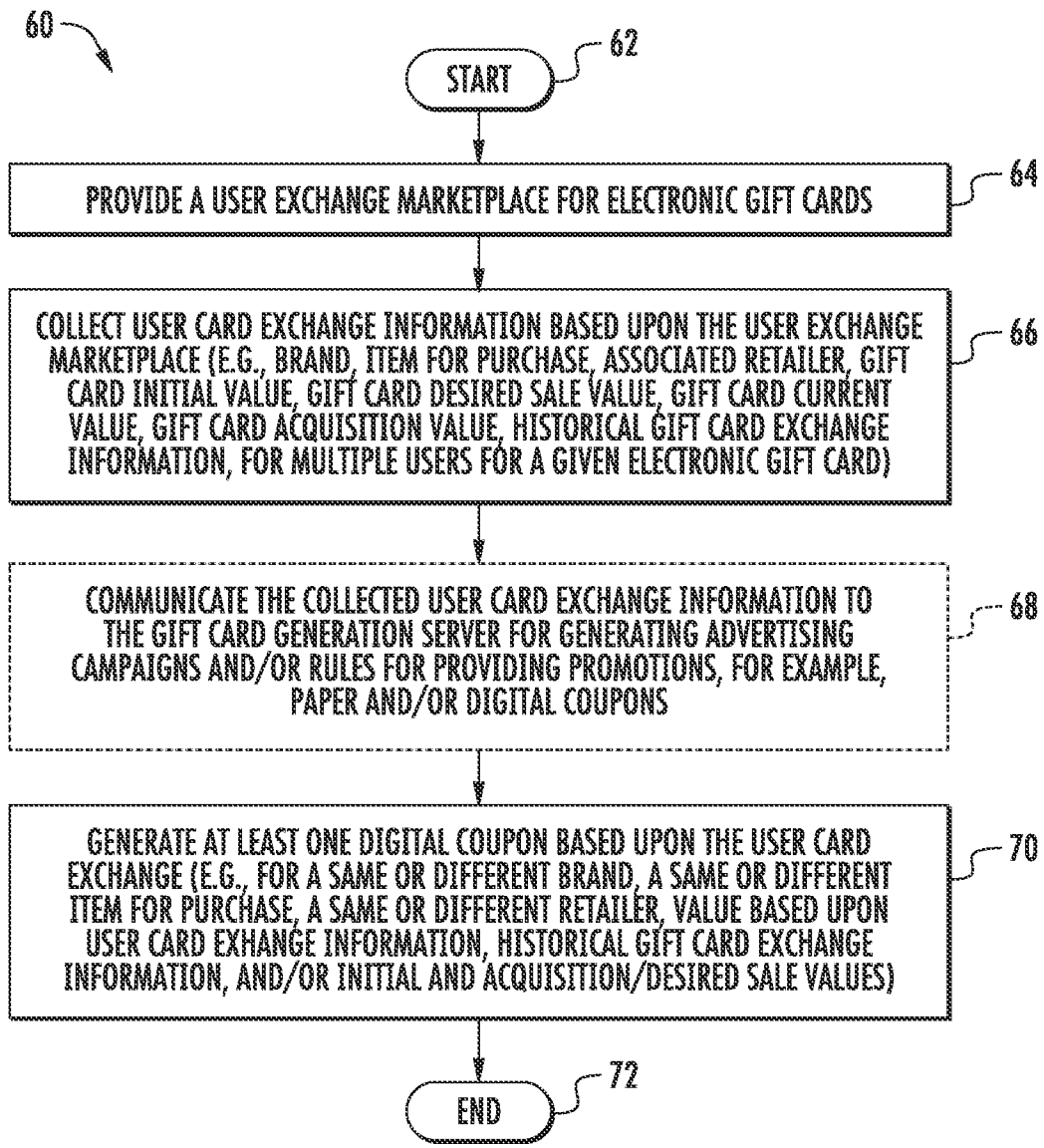
FIG. 3 is a flow chart of operation of the gift card exchange server of FIG. 2.

Referring now additionally to the flowchart 60 in FIG. 3, beginning at Block 62, operation of the system 20 will now be described. The card exchange processor 41 cooperates with the card exchange memory 42 to provide a user marketplace for the electronic gift cards 44 (Block 64) and collect user card exchange information 47 (Block 66). More particularly, the gift card exchange server 40 may provide a user exchange marketplace 43, for example, online or Internet based, whereby users who have electronic gift cards 44 can buy, sell, and/or trade their electronic gift cards to other users. A given user may register on the gift card exchange server 40 by providing certain user card exchange information 47, which may be stored in the card exchange memory 42. User card exchange information 47 provided by the given user during the registration process may include name, geographic location, email, gender, and age, for example. Of course, other and/or additional information may be collected upon registration and stored in the card exchange memory 42.

When a given user, for example a seller 22, is desirous of selling or trading an electronic gift card 45, the seller may provide additional user card exchange information 47, such as, the brand, item for purchase, or retailer associated with the electronic gift card. The user or seller 22 may also provide the unique identifier and/or PIN, initial value, and current value of the electronic gift card. In some embodiments, the user may provide the unique identifier and/or PIN, and the gift card exchange server 40 may retrieve, for example via the Internet, and store in the card exchange memory 42 the brand, item for purchase, shopping location, or retailer, the initial value, and the current value. The user or seller 22 may also provide a desired sale value for the electronic gift card. For example, the seller 22 may be desirous of selling a $100 electronic gift card 45 with a balance of $75 on it to retailer "A" for $50.

Another user, for example a buyer 23, may be desirous of buying or trading an electronic gift card 45. The other user or buyer 23 may register with the gift card exchange server 40 as described above. The buyer 23 may also provide a desired purchase value for an electronic gift card of a particular brand, item for sale, retailer, and/or shopping location. Upon a match or after negotiation between the buyer 23 and the seller 22, the electronic gift card 45 may be transferred to the buyer 23 from the seller 22, and the funds or acquisition value 46 (i.e., sale price) is transferred to the seller from the buyer. The funds may be transferred based upon a linked bank account or funds in an account associated with the user on the gift card exchange server 40 (e.g., a digital wallet). Of course, while the example above has been described with respect to a funds transfer, the exchanged value may be in the form of a trade of electronic gift cards, for example.

The user card exchange information 47 collected by the gift card exchange server 40 may optionally be communicated to the gift card generation server 30, for example, associated with manufacturer and/or retailer (Block 68). In addition to generating electronic gift cards 44, the gift card exchange server 40 may use the communicated user card exchange information 47 as a basis for generating advertising campaigns and/or rules for providing promotions, for example, paper and/or digital coupons.

The gift card exchange server 40, at Block 70, generates a digital coupon 48 based upon the user card exchange information 47. With respect to the example electronic gift card exchange described above, the gift card exchange server 40 may generate and communicate a digital coupon 48 to the seller 22 toward a purchase at retailer "A". The value of digital coupon 48 may be based upon the acquisition value or sale price relative to the current value at the time of the sale and/or the initial value of the electronic gift card 45. In the above example, the fact that the seller 22 used $25 of a $100 electronic gift card and sold the electronic gift card with a value of $75 for $50 may be indicative that the seller is not that favorable to retailer "A". Of course, the gift card exchange server 40 may generate a digital coupon 48 for a different retailer also based upon the user card exchange information 47. The information gained from this transaction may be considered more valuable than other types of information, for example, gained from performing a market sample, as the information is based upon affirmative steps taken by the seller 22.

With respect to the buyer 23, the gift card exchange server 40 may also generate and communicate a digital coupon 48 to the buyer toward a purchase at retailer "B", for example, to lure the buyer away from retailer "A" and try retailer "B". The value of digital coupon 48 may be based upon the acquisition value or sale price relative to the current value at the time of the sale and/or the initial value of the electronic gift card 45. In the above example, the fact that the buyer 23 purchased a once $100 electronic gift card with a value of $75 for $50 may be indicative that the buyer is favorable to retailer "A", but perhaps not as much if the buyer paid a price closer to the current value. Of course, the gift card exchange server 40 may generate a digital coupon 48 for the same retailer (e.g., retailer "A") also based upon the user card exchange information 47.

In some embodiments, the user card exchange information 47 may also include historical electronic gift card exchange information. The gift card exchange server 40 may generate the digital coupon 48 based also upon the historical electronic gift card exchange information 47. For example, a buyer 23 or seller 22 who historically favors a brand, retailer, and/or type of retailer or product may be presented with a digital coupon 48 for the brand, retailer, and/or type of retailer or products historically favored. Alternatively or additionally, the gift card exchange server 40 may generate the digital coupon 48 to have a value that is based upon relative values of previously exchanged electronic gift cards 44.

In some embodiments where the user card exchange information 47 includes a geographic location of either the user (e.g., buyer/seller 22, 23) or a shopping location, the gift card exchange server 40 may generate the digital coupon 48 based upon the geographic location of either the user (e.g., buyer/seller) or a shopping location. For example, the gift card exchange server 40 may generate the digital coupon 48 to have a coupon value that varies based upon the retailer's or shopping location and/or the geographic location of the user. The operations end at Block 72.

While exemplary user card exchange information 47 has been described herein, it should be appreciated by those skilled in the art that other and/or additional card exchange information may be collected and used as a basis for generating a digital coupon 48. The digital coupons 48 may be sent or communicated to one or both users (e.g., buyer 22, seller 23) in an electronic gift card transaction at the user exchange marketplace 43. For example, the gift card exchange server 40 may communicate (e.g., wirelessly) the digital coupons 48 to a mobile wireless communications device associated with the user for display or storage in a digital wallet for redemption at a point-of-sale (POS) terminal. The gift card exchange server 40 may store the digital coupons 48 in a digital wallet in the card exchange memory 42 for later redemption at a POS terminal.

As will be appreciated by those skilled in the art, the system 20 may advantageously provide increased usage efficiency of electronic gift cards. Additionally, the collection of the user card exchange information 47 in the manner set forth above may be considered a higher value or quality of data. More particularly, users positively provide information, so the system 20, and in some embodiments a retailer and/or manufacturer, is able to better characterize a user's likes, dislikes, and perceived value. Additionally, the system 20 provides increased efficiency by processing or using the user card exchange information 47 in multiple capacities, both for a digital coupon 48 and for providing a user exchange marketplace 43 for gift cards. These functions are typically mutually exclusive, and conventional gift card exchange systems do not operate with respect to digital promotions or coupons in the manner described herein.

A method aspect is directed to a method for generating at least one digital coupon 48 in a system 20 that includes a gift card generation server 30 configured to generate a plurality of electronic gift cards 44, 45. The method includes using a gift card exchange server 40 cooperating with the gift card generation server 30 to provide a user exchange marketplace 43 for the plurality of electronic gift cards 44, 45 and collect user card exchange information 47 based thereon and generate at least one digital coupon 48 based upon the user card exchange information.

A computer readable medium aspect is directed to a non-transitory computer readable medium for a system 20 that includes a gift card generation server 30 configured to generate a plurality of electronic gift cards 44, 45 and a gift card exchange server 40 cooperating with the gift card generation server. The non-transitory computer readable medium includes computer executable instructions that when executed by a processor 41 of the gift card exchange server 40 cause the process to perform operations that include providing a user exchange marketplace 43 for the plurality of electronic gift cards 44, 45 and collect user card exchange information 47 based thereon. The operations also include generating at least one digital coupon 48 based upon the user card exchange information 47.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
a buyer wireless communications device associated with a buyer;
a seller wireless communications device associated with a seller;
a gift card generation server configured to generate a plurality of electronic gift cards each having a retailer associated therewith; and
a gift card exchange server cooperating with said gift card generation server and configured to
obtain buyer and seller financial account information associated with the buyer and seller, respectively, for funding an electronic gift card exchange transaction between the buyer and the seller,
provide a user exchange marketplace between the buyer and the seller for the plurality of electronic gift cards and collect user card exchange information based thereon, the user card exchange information comprising a current value, a buyer acquisition value associated with a given one of the plurality of electronic gift cards, a geographic location of the corresponding retailer, and a seller geographic location,
match the buyer and the seller based upon the collected user card exchange information, and communicate the given electronic gift card to the buyer mobile wireless communications device based upon the matching as part of the electronic gift card exchange transaction,
process payment of the electronic gift card exchange transaction between the buyer and the seller by causing transfer of funds between the buyer and the seller based upon the buyer and seller financial account information,
generate at least one buyer digital coupon redeemable at a retailer different than the retailer corresponding to the given electronic gift card and based upon the user card exchange information, the at least one buyer digital coupon having a buyer redemption value based upon the buyer acquisition value relative to the current value at a time of exchange of the given one of the plurality of electronic gift cards between the buyer and the seller,
generate at least one seller digital coupon redeemable at the retailer corresponding to the given electronic gift card and based upon the user card exchange information, the at least one seller digital coupon having a seller redemption value based upon the buyer acquisition value relative to the current value at a time of the exchange of the given one of the plurality of electronic gift cards between the buyer and the seller, and a relative distance between the geographic location of the corresponding retailer and the seller geographic location,
communicate the at least one buyer and seller digital coupons to the buyer and the seller mobile wireless communications devices, respectively, and
store the at least one buyer and seller digital coupons in respective digital wallets associated with the buyer and seller, respectively.

2. The system of claim 1 wherein the user card exchange information comprises at least one of a brand, and item for purchase.

3. The system of claim 2 wherein said gift card exchange server is configured to generate the at least one digital coupon for one of a different brand, and a different item for purchase.

4. The system of claim 2 wherein said gift card exchange server is configured to generate the at least one digital coupon for one of a same brand, and same item for purchase.

5. The system of claim 1 wherein the user card exchange information comprises an initial value associated with a given one of the plurality of electronic gift cards.

6. The system of claim 5 wherein the buyer redemption value is based upon the buyer acquisition value relative to the initial value of the given one of the plurality of electronic gift cards; and wherein the seller redemption value is based upon the initial value relative to the current value of the given one of the plurality of electronic gift cards.

7. The system of claim 1 wherein said gift card exchange server comprises a processor and a memory coupled thereto for storing the user card exchange information.

8. The system of claim 1 wherein the user card exchange information comprises historical electronic gift card exchange information.

9. The system of claim 1 wherein said gift card exchange server is configured to communicate the collected user card exchange information to said gift card generation server.

10. The system of claim 1 wherein the user card exchange information comprises user card exchange information for a plurality of users for a given one of the plurality of electronic gift cards.

11. A gift card exchange server cooperating with a gift card generation server configured to generate a plurality of electronic gift cards each having a retailer associated therewith, the gift card exchange server comprising:
a memory; and
a processor coupled to said memory and configured to
obtain buyer and seller financial account information associated with the buyer and seller, respectively, for funding an electronic gift card exchange transaction between the buyer and the seller,
provide a user exchange marketplace between a buyer and a seller for the plurality of electronic gift cards and collect user card exchange information based thereon, the user card exchange information comprising a current value, a buyer acquisition value associated with a given one of the plurality of electronic gift cards, a geographic location of the corresponding retailer, and a seller geographic location,
match the buyer and the seller based upon the collected user card exchange information, and communicate the given electronic gift card to a buyer mobile wireless communications device associated with the buyer based upon the matching as part of the electronic gift card exchange transaction,
process payment of the electronic gift card exchange transaction between the buyer and the seller by causing transfer of funds between the buyer and the seller based upon the buyer and seller financial account information,
generate at least one buyer digital coupon redeemable at a retailer different than the retailer corresponding to the given electronic gift card and based upon the user card exchange information, the at least one digital coupon having a buyer redemption value based upon the buyer acquisition value relative to the current value at a time of exchange of the given one of the plurality of electronic gift cards between the buyer and the seller,
generate at least one seller digital coupon redeemable at the retailer corresponding to the given electronic gift card and based upon the user card exchange information, the at least one seller digital coupon having a seller redemption value based upon the buyer acquisition value relative to the current value at a time of the exchange of the given one of the plurality of electronic gift cards between the buyer and the seller, and a relative distance between the geographic location of the corresponding retailer and the seller geographic location,
communicate the at least one buyer and seller digital coupons to the buyer mobile wireless communications device and a seller wireless communications device associated with the seller, respectively, and
store the at least one buyer and seller digital coupons in respective digital wallets associated with the buyer and seller, respectively.

12. The gift card exchange server of claim 11 wherein the user card exchange information comprises at least one of a brand, and item for purchase.

13. The gift card exchange server of claim 12 wherein said processor is configured to generate the at least one digital coupon for one of a different brand, and different item for purchase.

14. The gift card exchange server of claim 12 wherein said processor is configured to generate the at least one digital coupon for one of a same brand, and same item for purchase.

15. The gift card exchange server of claim 11 wherein the user card exchange information comprises an initial value associated with a given one of the plurality of electronic gift cards.

16. The gift card exchange server of claim 15 wherein the buyer redemption value is based upon the buyer acquisition value relative to the initial value of the given one of the plurality of electronic gift cards; and wherein the seller redemption value is based upon the initial value relative to the current value of the given one of the plurality of electronic gift cards.

17. A method for generating at least one digital coupon in a system comprising a gift card generation server configured to generate a plurality of electronic gift cards each having a retailer associated therewith, the method comprising:
using a gift card exchange server cooperating with the gift card generation server to
obtain buyer and seller financial account information associated with the buyer and seller, respectively, for funding an electronic gift card exchange transaction between the buyer and the seller,
provide a user exchange marketplace between a buyer and a seller for the plurality of electronic gift cards and collect user card exchange information based thereon, the user card exchange information comprising a current value, a buyer acquisition value associated with a given one of the plurality of electronic gift cards, a geographic location of the corresponding retailer, and a seller geographic location, match the buyer and the seller based upon the collected user card exchange information, and communicate the given electronic gift card to a buyer mobile wireless communications device associated with the buyer based upon the matching as part of the electronic gift card exchange transaction, process payment of the electronic gift card exchange transaction between the buyer and the seller by causing transfer of funds between the buyer and the seller based upon the buyer and seller financial account information, generate at least one buyer digital coupon redeemable at a retailer different than the retailer corresponding to the given electronic gift card and based upon the user card exchange information, the at least one buyer digital coupon having a buyer redemption value based upon the buyer acquisition value relative to the current value at a time of exchange of the given one of the plurality of electronic gift cards between the buyer and the seller, generate at least one seller digital coupon redeemable at the retailer corresponding to the given electronic gift card and based upon the user card exchange information, the at least one seller digital coupon having a seller redemption value based upon the buyer acquisition value relative to the current value at a time of the exchange of the given one of the plurality of electronic gift cards between the buyer and the seller, and a relative distance between the geographic location of the corresponding retailer and the seller geographic location, communicate the at least one buyer and seller digital coupons to the buyer mobile wireless communications device and a seller mobile wireless communications device associated with the seller, respectively, and store the at least one buyer and seller digital coupons in respective digital wallets associated with the buyer and seller, respectively.

18. The method of claim 17 wherein the user card exchange information comprises at least one of a brand, and item for purchase.

19. The method of claim 18 wherein the gift card exchange server is used to generate the at least one digital coupon for one of a different brand, and different item for purchase.

20. The method of claim 18 wherein the gift card exchange server is used to generate the at least one digital coupon for one of a same brand, and same item for purchase.

21. The method of claim 17 wherein the user card exchange information comprises an initial value associated with a given one of the plurality of electronic gift cards.

22. The method of claim 21 wherein the buyer redemption value is based upon the buyer acquisition value relative to the initial value of the given one of the plurality of electronic gift cards; and wherein the seller redemption value is based upon the initial value relative to the current value of the given one of the plurality of electronic gift cards.

23. A non-transitory computer readable medium for a system comprising a gift card generation server configured to generate a plurality of electronic gift cards each having a retailer associated therewith, and a gift card exchange server cooperating with the gift card generation server, the non-transitory computer readable medium comprising computer executable instructions that when executed by a processor of the gift card exchange server cause the processor to perform operations comprising:

obtaining buyer and seller financial account information associated with the buyer and seller, respectively, for funding an electronic gift card exchange transaction between the buyer and the seller;

providing a user exchange marketplace between a buyer and a seller for the plurality of electronic gift cards and collect user card exchange information based thereon, the user card exchange information comprising a current value, a buyer acquisition value associated with a given one of the plurality of electronic gift cards, a geographic location of the corresponding retailer, and a seller geographic location;

matching the buyer and the seller based upon the collected user card exchange information, and communicate the given electronic gift card to a buyer mobile wireless communications device associated with the buyer based upon the matching as part of the electronic gift card exchange transaction;

processing payment of the electronic gift card exchange transaction between the buyer and the seller by causing transfer of funds between the buyer and the seller based upon the buyer and seller financial account information;

generating at least one buyer digital coupon redeemable at a retailer different than the retailer corresponding to the given electronic gift card and based upon the user card exchange information, the at least one digital coupon having a buyer redemption value based upon the buyer acquisition value relative to the current value at a time of exchange of the given one of the plurality of electronic gift cards between the buyer and the seller;

generating at least one seller digital coupon redeemable at the retailer corresponding to the given electronic gift card and based upon the user card exchange information, the at least one seller digital coupon having a seller redemption value based upon the buyer acquisition value relative to the current value at a time of the exchange of the given one of the plurality of electronic gift cards between the buyer and the seller, and a relative distance between the geographic location of the corresponding retailer and the seller geographic location;

communicating the at least one buyer and seller digital coupons to the buyer mobile wireless communications device and a seller mobile wireless communications device associated with the seller, respectively; and storing the at least one buyer and seller digital coupons in respective digital wallets associated with the buyer and seller, respectively.

24. The non-transitory computer readable medium of claim 23 wherein the user card exchange information comprises at least one of a brand, and item for purchase.

25. The non-transitory computer readable medium of claim 24 wherein the operations cause the processor to generate the at least one digital coupon for one of a different brand, and different item for purchase.

26. The non-transitory computer readable medium of claim 24 wherein operations cause the processor to generate the at least one digital coupon for one of a same brand, and same item for purchase.

27. The non-transitory computer readable medium of claim 23 wherein the user card exchange information comprises an initial value associated with a given one of the plurality of electronic gift cards.

28. The non-transitory computer readable medium of claim 27 wherein the buyer redemption value is based upon the buyer acquisition value relative to the initial value of the given one of the plurality of electronic gift cards; and wherein the seller redemption value is based upon the initial value relative to the current value of the given one of the plurality of electronic gift cards.

\* \* \* \* \*